US010221833B2

(12) United States Patent
Shakespeare et al.

(10) Patent No.: US 10,221,833 B2
(45) Date of Patent: Mar. 5, 2019

(54) SAIL BASED WIND ENERGY SYSTEM

(71) Applicants: Walter Jeffrey Shakespeare, Macungie, PA (US); Parker Egan Jones, Pittsburgh, PA (US)

(72) Inventors: Walter Jeffrey Shakespeare, Macungie, PA (US); Parker Egan Jones, Pittsburgh, PA (US)

( * ) Notice: Subject to any disclaimer, the term of this patent is extended or adjusted under 35 U.S.C. 154(b) by 129 days.

(21) Appl. No.: 15/415,780

(22) Filed: Jan. 25, 2017

(65) Prior Publication Data

US 2018/0209402 A1 Jul. 26, 2018

(51) Int. Cl.
| | |
|---|---|
| *F03D 9/25* | (2016.01) |
| *F03D 3/04* | (2006.01) |
| *F03D 1/04* | (2006.01) |
| *F03D 3/00* | (2006.01) |
| *F03D 7/06* | (2006.01) |
| *F03D 9/35* | (2016.01) |
| *F03D 9/00* | (2016.01) |

(52) U.S. Cl.
CPC ............ *F03D 3/0427* (2013.01); *F03D 1/04* (2013.01); *F03D 3/005* (2013.01); *F03D 3/0418* (2013.01); *F03D 7/06* (2013.01); *F03D 9/255* (2017.02); *F03D 9/35* (2016.05); *F03D 9/007* (2013.01); *F05B 2240/9112* (2013.01); *Y02B 10/30* (2013.01); *Y02E 10/728* (2013.01); *Y02E 10/74* (2013.01)

(58) Field of Classification Search
CPC . F03D 3/0427; F03D 1/04; F03D 9/35; F03D 3/0418; F03D 7/06; F03D 3/005; F03D 9/255; F03D 9/007; F03D 9/25; F05B 2240/9112; Y02E 10/74; Y02B 10/30
See application file for complete search history.

(56) References Cited

U.S. PATENT DOCUMENTS

| | | | | |
|---|---|---|---|---|
| 8,310,072 | B2 * | 11/2012 | Reitz | F03D 1/04 290/44 |
| 9,041,238 | B2 * | 5/2015 | McMahon | F03D 3/002 290/55 |
| 9,133,822 | B2 * | 9/2015 | Tang | E04D 13/103 |
| 9,453,494 | B2 * | 9/2016 | Krippene | F03D 9/39 |
| 2010/0034649 | A1 * | 2/2010 | Taylor | F03B 17/061 415/208.1 |

* cited by examiner

*Primary Examiner* — Michael C Zarroli
(74) *Attorney, Agent, or Firm* — Chen-Chi Lin

(57) ABSTRACT

A system utilizes conventional sail technology to greatly increase the wind energy captured at modest cost. The use of a large area collector for wind energy, such as a sail, allows the conversion of wind kinetic energy into pressure so as to be further converted into mechanical or electrical energy in a much smaller turbine than in the conventional wind mill configuration. The collector is characterized by a deployed condition and a furled condition. In the deployed condition, a plurality of flexible membranes of the collector are deployed over an entirety or a portion of a roof. In the furled condition, plurality of flexible membranes are furled.

12 Claims, 6 Drawing Sheets

SAIL BASED WIND ENERGY SYSTEM

CROSS-REFERENCE TO RELATED APPLICATION

This application claims priority of provisional application Ser. No. 62/388,495, filed Feb. 1, 2016 and entitled "Sail Based Wind Energy System".

FIELD OF THE INVENTION

The invention pertains to the field of renewable energy conversion, specifically to wind energy conversion for the individual household. A system is described which allows the efficient conversion of wind energy over a house roof top without the need for a large diameter blade and associated high costs, structural reinforcement and noise of the current state of the art systems.

BACKGROUND OF THE INVENTION

Wind energy can be converted to electrical energy by large central wind turbine farms located on hill tops, off shore and at other windy locations. But these wind turbines are very large, high and expensive, are unsightly, and can harm the natural fauna with the long spinning blades. The efficiency of these systems is limited and even in areas of regular wind such as along the shore or on mountain tops, the energy produced is orders of magnitude less than conventional steam electric stations. Suitable locations for these wind farms are also limited making wind energy conversion only a very small part of the green energy technology portfolio.

An effective alternative to wind farms and large wind turbines is the individual wind mill located in each residence. Such a distributed system has many advantages including relatively low capital investment through the individual homeowner, the ability to utilize the energy on site, eliminating much of the transmission loss associated with central stations, and the fact that the wind is usually blowing somewhere making the overall effectiveness of a distributed wind energy system better than a large central wind energy farm. Since residential buildings are ubiquitous and widely distributed, both in the cities and in suburban and rural areas, it is possible, with the right economic incentives to have tens of millions of wind energy conversion systems on homes throughout the country.

Current residential wind energy systems, whether the conventional horizontal or the vertical axis configuration, suffer from several severe limitations leading to low adoption rates:

Residential buildings are not structurally built to handle the high forces of a windmill on the roof. Consequently, there is a need for building a high tower on the residence property to mount the blade system and this is both expensive and unsightly. Even for much smaller windmills that could be roof mounted, the noise of the blades passing by the support structure is typically not acceptable for a homeowner.

Windmill theoretical maximum efficiency is given by the Betz limit wherein no more than 59% of the energy in the wind may be converted to useful work. This is because for a windmill propeller system, the wind velocity would have to approach zero to extract all of the kinetic energy, and this is impossible since the wind must exit the blade system.

These issues combine to make residential windmills impractical for the typical homeowner, leading to very low adoption rates. What is needed is a system that can capture a large cross sectional area of the wind on a roof top and to extract that energy with a small highly efficient turbine, eliminating the theoretical Betz limit and greatly reducing the noise without the need for a large tower or capital investment in a high structure, since the roof is typically high above ground level and in the wind already. For many thousands of years wind has been captured to do useful work using sail technology. Sails can present a large cross sectional area to catch the wind such as in a sailing vessel. In ancient Rome, the shading of the Coliseum was accomplished by sailors with large awning like sail structures borrowed from the sail technology. The deployment and management of the sails can be accomplished with lines as sheets, guys and winches as well as poles and booms to secure the sail position. This technology allows reefing of the sail in high wind conditions and greater area during lighter airs, as opposed to the typical bladed windmill with constant cross sectional area. Sail technology also has the advantage of allowing the most efficient presentation to the wind, and the sail can be completely furled during snowstorms or inclement weather. A roof top sail also has the advantage of presenting a large area to the sun so that solar cells could be mounted on top of it, then furled during snowstorms to keep the solar cells clear of snow. And a retractable sail would look reasonable if deployed from the roof peak ridge and could be made of colorful fabric such as spinnaker sails on yachts.

PRIOR ART

Charnesky et al. U.S. Pat. No. 9,013,054 B1 teaches a vertical wind turbine with turning blades and an inlet port that is open to the wind. This allows a relatively compact blade arrangement which should reduce the noise and cost of a rooftop system. The present invention differs from this innovation by catching substantially more of the wind using sail technology on the roof and by orienting the input to the vertical turbine in an annular arrangement such that it is open to the wind from any direction. In addition the present invention utilizes the stagnation pressure energy of the captured air much as a pitot tube to drive the vertical turbine rather than just the kinetic energy of the flowing air.

Bradley in U.S. Pat. No. 8,979,494 teaches a sail based blading system for a vertical axis wind turbine. This system increases the area of the blades for additional wind capture but utilizes the blade system sails only to capture the wind rather than the sail based capture area much larger than the blades available from the roof top sail structure.

Trachsell U.S. Pat. No. 8,907,515 B2 teaches a horizontally mounted wind energy transfer system suitable for mounting on the roof ridge top of a building. The blading arrangement converts the wind energy to electricity for any wind blowing over the roof of the structure. The total energy conversion is limited to the size of the blades and the wind velocity and utilizes the kinetic energy of the flowing air rather than collecting a large cross section of the wind and converting the energy to pressure energy for the much smaller turbine as in the present invention.

Carmein et al. U.S. Pat. No. 8,878,150 B2 shows a method of extracting wind energy without the use of any blade system. However the efficiency of this approach may not be very high depending on the energy needed to create the electric field and charge particles. Again, the total available energy for conversion is dependent only on the kinetic energy of the captured air stream which in turn is limited to the cross sectional area of the electric field.

Bates et al. teaches a modular wind energy conversion unit with vertical blades. This unit requires some type of tower to get it up into the wind and if mounted on a roof top would require substantial structure. The wind energy conversion is limited to the blade cross section area in the wind, whereas the present invention captures a very large cross sectional area utilizing sail technology and converts that wind kinetic energy to pressure energy for conversion in a much smaller turbine system.

Steinlechner in U.S. Pat. No. 8,791,588 B2 teaches a vertical turbine combined with a duct system creating a funnel effect to increase air velocity from the flowing wind and convert more energy to mechanical or electrical energy. The system is low profile and uses axial oriented stator and rotor blades to effectively direct the air flow over the rotor blades. This system is designed for a duct with varying cross section whereas the present invention is specifically designed for roof top energy conversion and converts the large area of flowing wind kinetic energy to pressure for radial introduction into the small turbine. In addition, the radially oriented turning vanes can be adjusted depending on wind speed to optimize the angle of attack for the turbine rotor blades.

Paggi, U.S. Pat. No. 8,545,298 B2, shows a roof top wind energy collection system using a paddle wheel structure and a set of vanes to direct the wind into the blade system. Compared to the present invention, this system is very inefficient when the wind is blowing substantially parallel to the peaked roof ridge and is unsuitable for mounting on a sloped or flat roof. The Paggi system again utilizes the kinetic energy of the air flowing over the windmill blades and captures only the wind energy in the cross sectional area of the blades. The present invention captures wind energy from any direction with a cross sectional area substantially the size of the entire roof.

The major innovation of the present invention compared to prior art is the use of a wind collection sail to greatly increase the cross section area of wind capture compared to just the blades or energy conversion system alone. The large capture area of the sail allows the conversion of the kinetic energy of the wind to pressure energy for conversion to electrical or mechanical energy in an efficient small turbine overcoming the Betz limit in conventional wind energy systems.

SUMMARY OF THE INVENTION

This invention relates to the use of sail technology to create a residential rooftop wind energy conversion system. In one preferred embodiment, the system consists of a retractable awning-like roof top sail with side panels that allow ingress of the wind but not egress by a damper system to capture the wind energy pressure. The energy is extracted by a small specialty turbine that can be automatically adjusted for maximum efficiency depending on the wind velocity. The rooftop turbine greatly improves the efficiency of the bladed windmill beyond the Betz limit by utilizing the principle of the venturi to increase the velocity of the air through the turbine and allow greater extraction of energy. There are several direct benefits to this approach, including the ability to reef or furl the sail depending on wind speed and weather conditions, greatly reduced noise and structural requirements for the turbine due to its small diameter and vertical mounting, the capability of catching a very large cross sectional area of the wind with relatively inexpensive fabric rather than large unsightly blades, and the ability to utilize the existing residential roof structure rather than building a separate expensive tower.

In the second preferred embodiment, an additional solid roof structure with solid damper panels is built on top of the original roof. The damper panels allow ingress of the air but not egress and can be opened to reduce the wind load on the structure in case of high wind conditions. The structure conforms to the typical residential architecture and appears as another story on the home with, for example a cupola hiding the turbine. The additional structure allows mounting traditional solar panels for combined wind and solar energy conversion. As an alternative to the damper panels, a cloth based side panel structure could be utilized to combine with the first preferred embodiment and the solid structure could be raised and lowered depending on conditions.

In either preferred embodiment, the availability of the grid tie box allows the electric power grid to serve as a sort of battery system such that when the wind is blowing the system has the capability of running the residential electric meter in reverse depending on the home power usage and wind speed. Alternatively when the wind is calm, the home relies on the electrical grid for power. The net effect is to reduce the overall electric power cost for the household without the need for an expensive energy storage system.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and are not to scale.

DETAILED DESCRIPTION

Figure 1A:
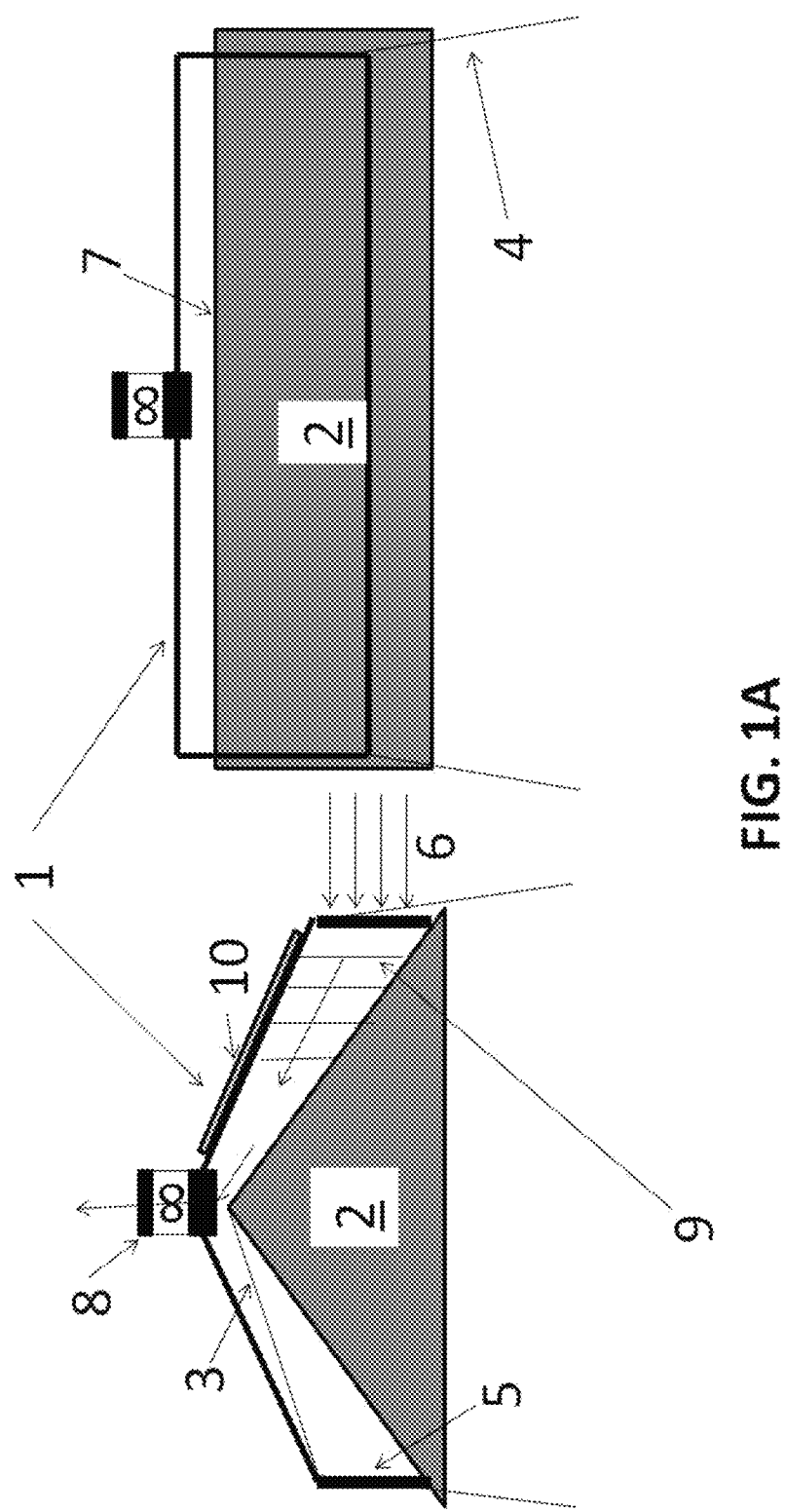
FIG. 1A shows the first preferred embodiment with a roof top sail arrangement that is deployable depending on wind and weather conditions. Shown in deployed position.

Referring now to FIG. 1A, in the first preferred embodiment a wind catching sail 1 is deployed over the entire or some portion of the structure roof 2. The deployment is done much as on a sailing vessel with sheets 3, guys 4 and winches along with poles/masts 5 to optimize the catching sail position for maximum wind collection, hold the sail in place and control the deployed area to limit the forces on the structure depending on wind velocity 6 similar to reefing on a sailboat. In this preferred embodiment the sail is envisioned to be deployed from the roof ridge 7 in two directions down the sides of the roof similar to roller furling gear on a jib sail. A small wind turbine 8 converts the kinetic energy in the wind catching sail to pressure and then to mechanical and electrical energy. The structure is provided with a damping system 9 that allows wind to enter the structure but prevents wind energy leaving. In one preferred embodiment, there are solar panels 10 mounted on the catching sail to make additional electricity from sunlight when the sail is deployed. In one preferred embodiment, the control of the sheets, guys and poles is accomplished with a smart electronic system that reads the wind direction and speed and automatically makes the necessary adjustments to the catching sail.

Figure 1B:
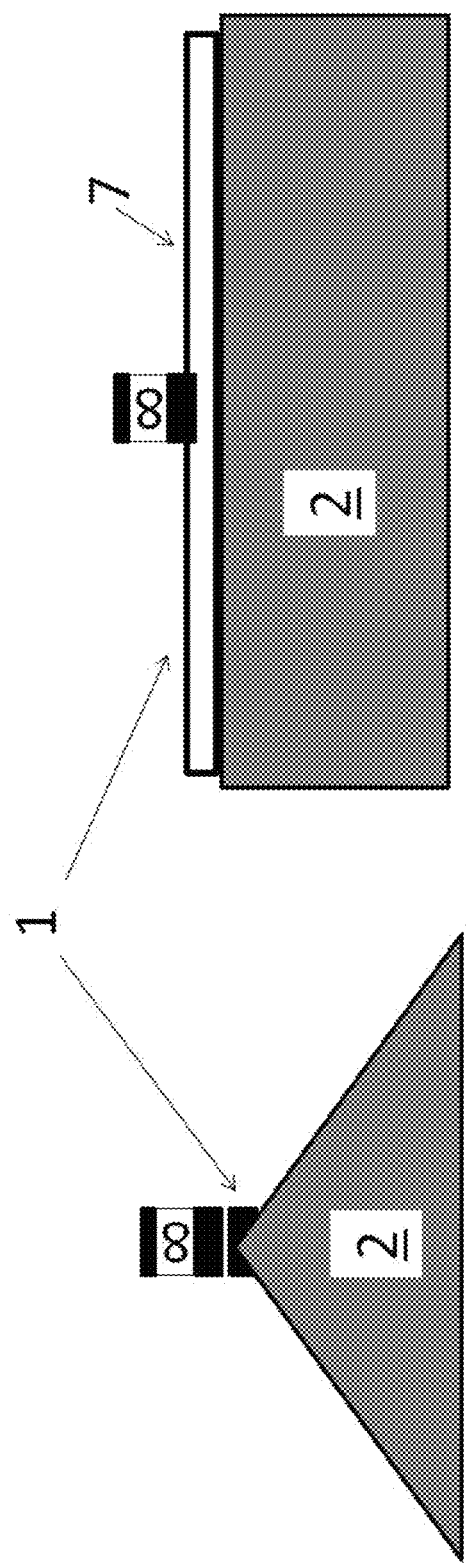
FIG. 1B shows the first preferred embodiment with a roof top sail arrangement shown in the furled position.
Figure 2:
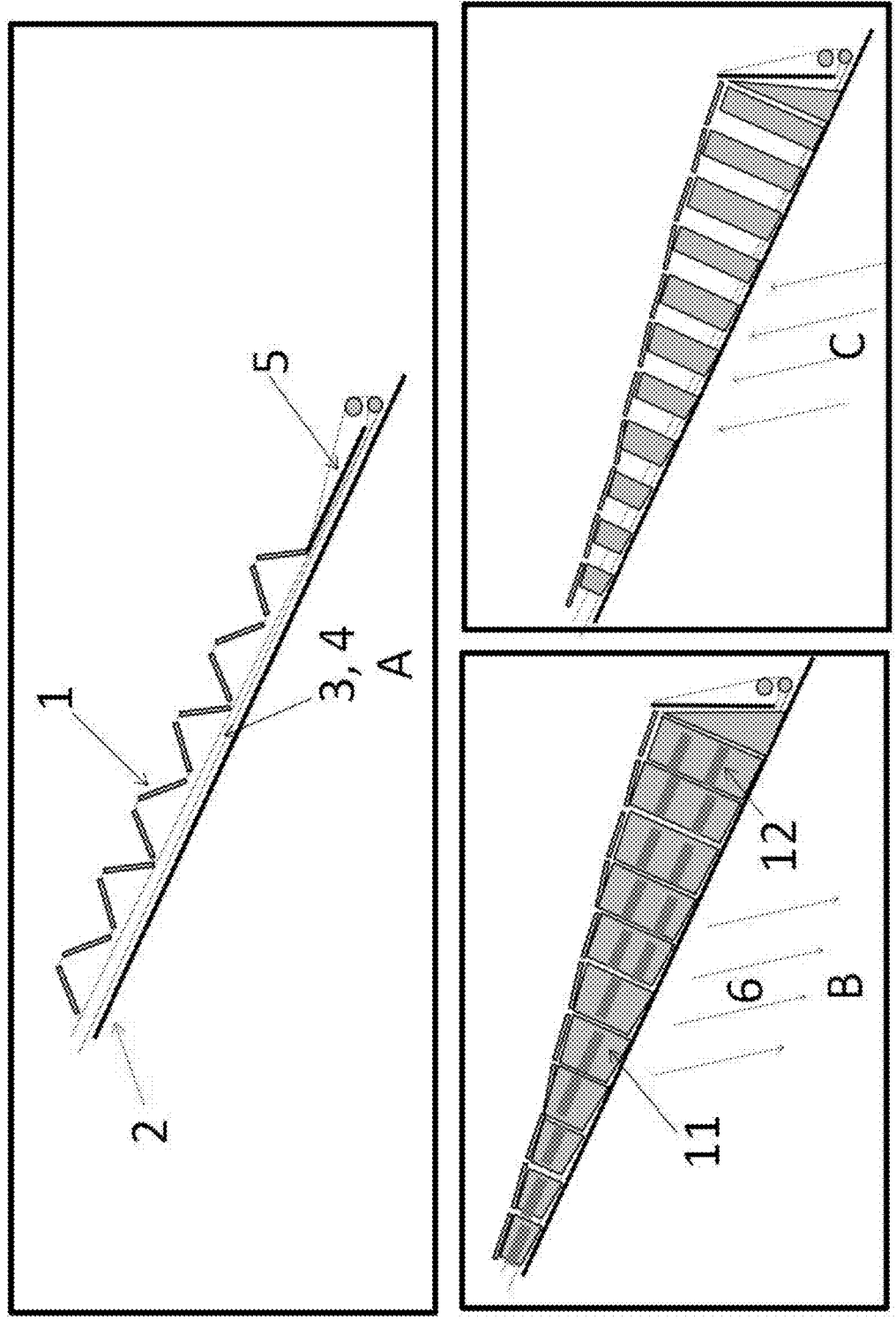
FIG. 2 is an exemplary sketch of the first preferred embodiment showing the retractable cloth roof top sail arrangement with side panel dampers for catching the wind.

FIG. 1B shows the sail 1 furled in the roof top ridge 7 housing. FIG. 2A shows the deployable main sail being deployed with sail panels 11 covering the sides and front of the sail down to the roof. These panels are rigged with stiffeners 12 similar to sail battens to blow open, FIG. 2C when the wind is blowing toward the structure from any side, but closed, FIG. 2B to prevent the escape of the air on the opposite side. This causes the kinetic energy of the flowing air of the wind 6 to be converted to pressure according to Bernoulli's equation and this higher pressure air then drives a small roof top turbine 8. Structural integrity of the anchor points for the roof top sail may be supplemented with wire tie downs anchored to concrete footers at the corners and ridges of the house similar to stays on a sailboat.

Figure 3:
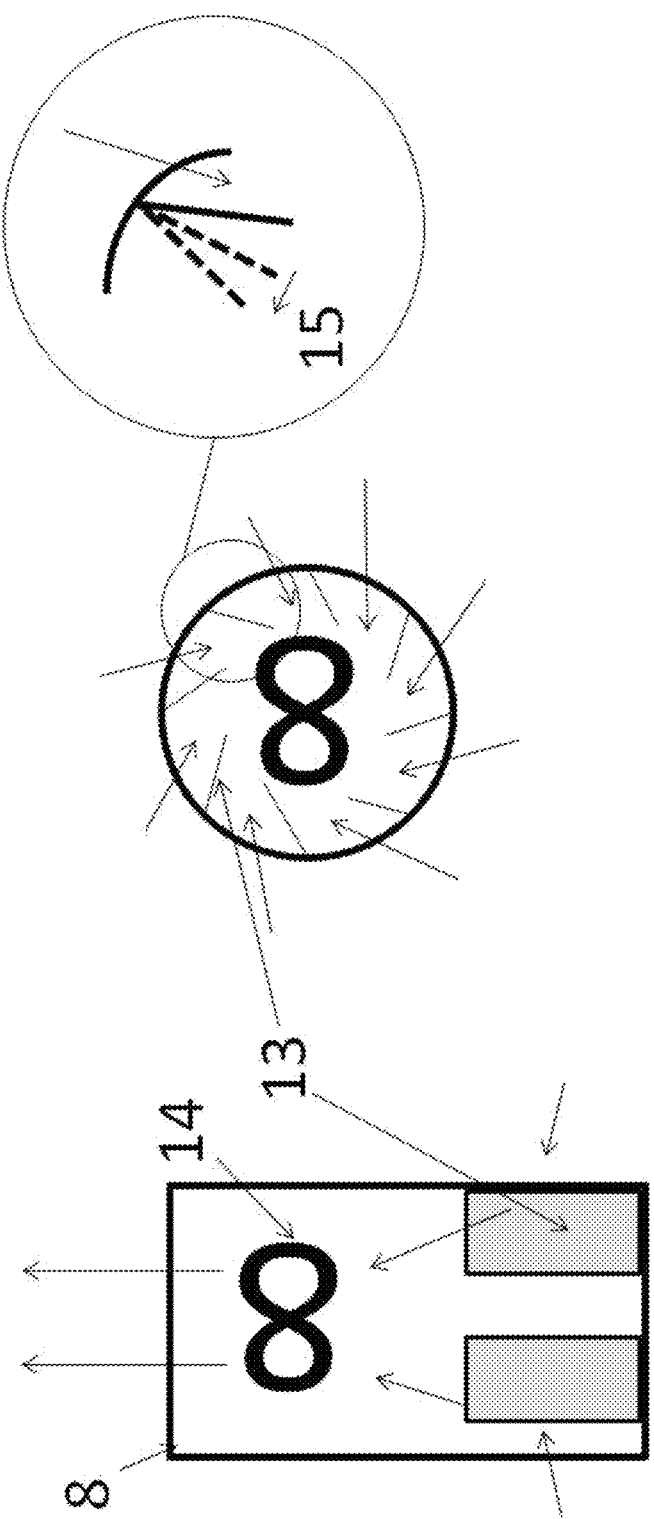
FIG. 3 shows the wind turbine with turning vanes to optimize the performance of the turbine depending on wind speed.

Referring to FIG. 3, the vertical axis rooftop turbine 8 is designed to allow the ingress of air from any side. The turbine has several features that contribute to higher efficiency including a set of adjustable inlet vanes 13 that direct the air flow toward the turbine blades 14 for optimum angle 15 of attack and efficiency depending on the wind speed. The rotational velocity of the turbine blades may be controlled with the voltage on the generator unit to optimize the angular velocity for any wind speed so that the maximum energy may be extracted from the air mass flow.

Figure 4:
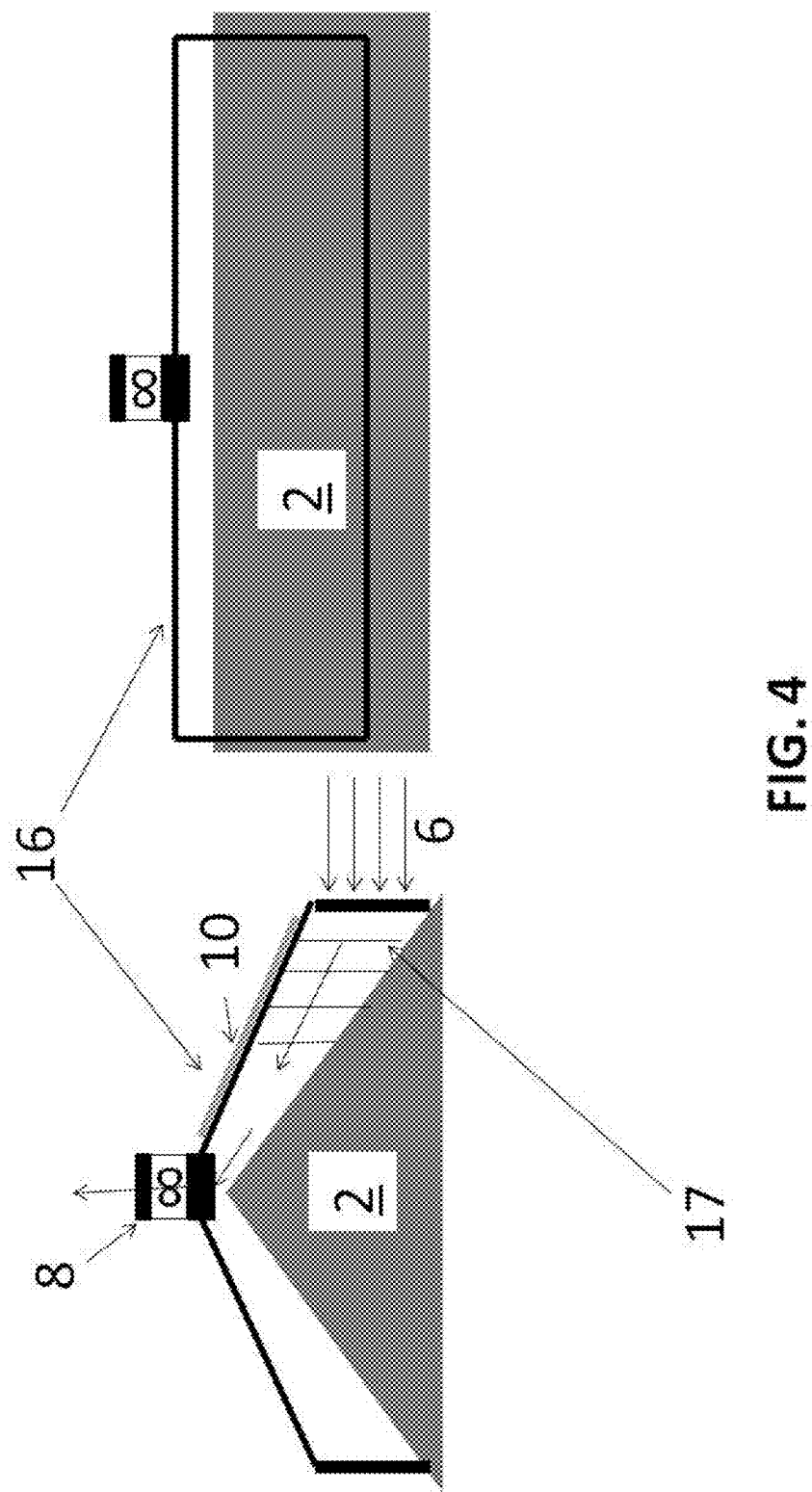
FIG. 4 shows the second preferred embodiment with the solid structural wind catching roof and the adjustable wind capture dampers.
Figure 5:
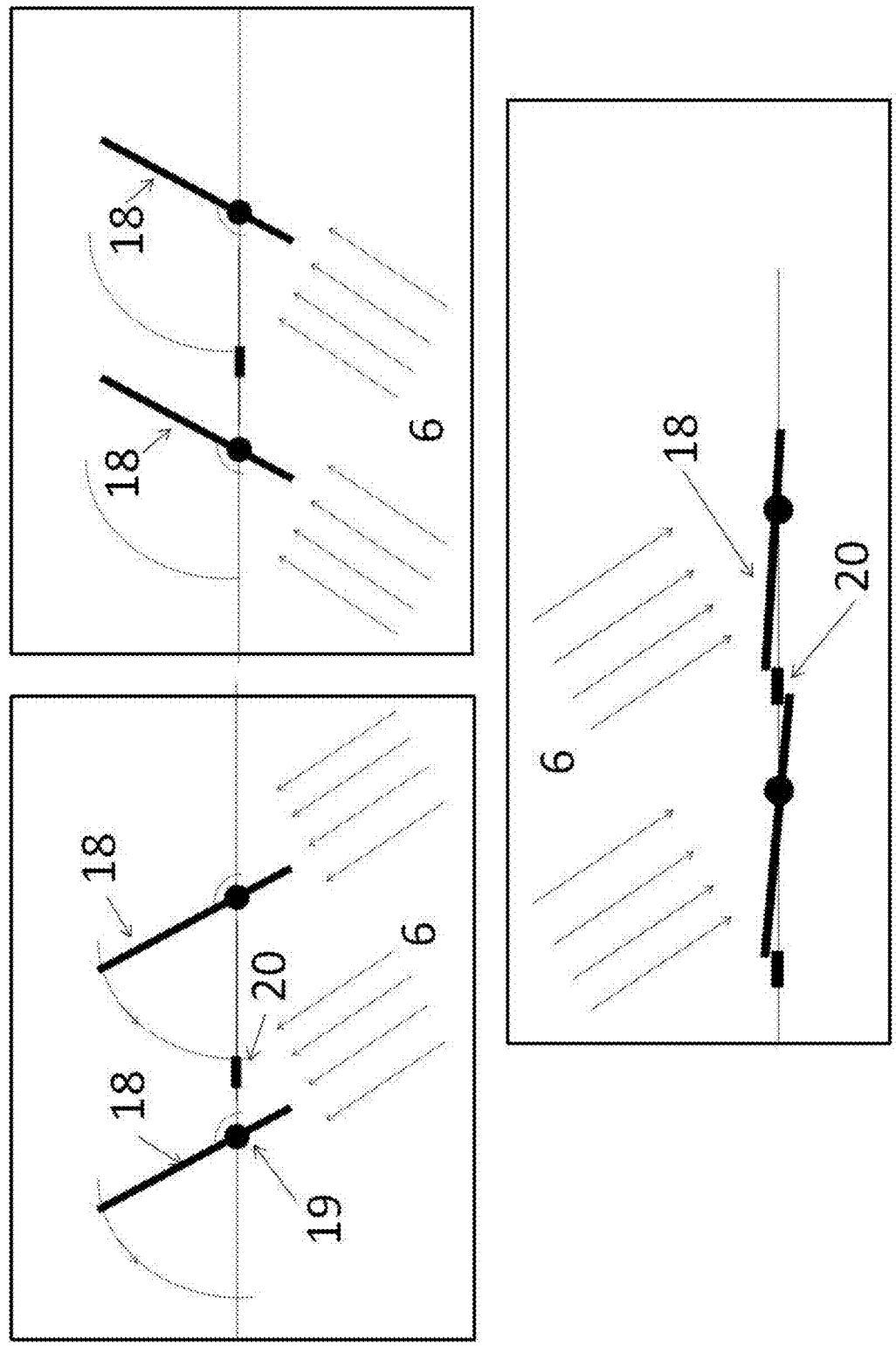
FIG. 5 is an exemplary sketch of the solid damper system for the second preferred embodiment.

FIG. 4 shows an alternative preferred embodiment with a solid second roof structure 16 architecturally integrated into the house. The solid structure has baffle panels 17 on three sides to allow the wind to enter the structure but not exit, as shown in FIG. 5. In one preferred embodiment the damper panels 18 are oriented vertically and have a lightly spring loaded axis of rotation 19. When the wind blows toward the structure from any direction, the dampers are blown open and allow the air to enter. At the opposite side, the dampers are pushed closed against the damper stop 20 blocking egress of the air from the structure and forcing all the air through the power generating turbine.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. Apparatus designed for mounting on a roof of a residential or commercial structure, the apparatus comprising
   a collector comprising
      a plurality of flexible membranes; and
   a turbine;
   wherein the apparatus catches wind;
      funnels the wind to the turbine; and
      extracts kinetic energy of the wind; and
   wherein the collector is characterized by:
      a deployed condition in which
         the plurality of flexible membranes are deployed over an entirety or a portion of the roof; and
      a furled condition in which
         the plurality of flexible membranes are furled.

2. The apparatus of claim 1 further comprising a plurality of poles and a plurality of guys configured to adjust the collector according to change of conditions of the wind.

3. The apparatus of claim 1, wherein the turbine is equipped with a plurality of adjustable guide vanes configured to be adjusted based on a speed of the wind so as to increase an efficiency of the turbine.

4. The apparatus of claim 1 further comprising a plurality of solar cells mounted on a top surface of the collector; wherein the collector is characterized by the deployed condition in which the plurality of solar cells are configured to generate electrical energy from solar radiation.

5. The apparatus of claim 1, wherein an output of the turbine is tied to a grid tie box so as to eliminate an need for local energy storage in times of low wind.

6. The apparatus of claim 1 further comprising a smart system configured to sense wind speed and direction so as to adjust the collector to increase efficiency and magnitude of wind energy collection.

7. The apparatus of claim 1, wherein the collector is positioned between the roof and the turbine.

8. The apparatus of claim 7, wherein the collector is characterized by the deployed condition in which a path of the wind is formed by the collector, the turbine and the roof so that the wind travels between a top surface of the collector and the roof; the wind enters an inlet of the turbine at a bottom of the turbine; and the wind exits an outlet of the turbine at a top of the turbine.

9. The apparatus of claim 8 further comprising a damping system in the path of the wind; wherein the damping system comprises a plurality of paralleled damping panels.

10. The apparatus of claim 7 further comprising a plurality of sail panels strengthened by a plurality of stiffeners; wherein the plurality of sail panels cover sides and fronts of the plurality of flexible members down to the roof.

11. The apparatus of claim 7 further comprising a plurality of sheets; a plurality of guys; a plurality of winches; a plurality of poles; and a plurality of masts configured to adjust a plurality of positions of the plurality of flexible membranes.

12. The apparatus of claim 7 further comprising a plurality of damping panels;
   wherein each damping panel of the plurality of damping panels is rotatable about an axis;
   wherein each damping panel is spring loaded; and
   wherein each damping panel is characterized by:
      an open condition in which
         each damping panel is blown open by a first directional wind along a first direction; and
      a closed condition in which
         each damping panel is closed against a respective damper stop by a second directional wind along a second direction opposite the first direction.

* * * * *